United States Patent [19]

Rosof

[11] 4,173,467

[45] Nov. 6, 1979

[54] PROCESS FOR RECOVERING VALUABLE METALS FROM SUPERALLOY SCRAP

[75] Inventor: Barry H. Rosof, Indianapolis, Ind.

[73] Assignee: Cabot Corporation, Boston, Mass.

[21] Appl. No.: 909,729

[22] Filed: May 26, 1978

[51] Int. Cl.² .............................................. C22B 23/04
[52] U.S. Cl. .......................................... 75/119; 75/48; 75/101 R; 75/121; 75/82
[58] Field of Search ........................ 75/48, 63, 82, 119, 75/121, 101 R

[56] References Cited

U.S. PATENT DOCUMENTS 3,438,730  4/1969  Shwayder .............................. 75/119
3,649,487  3/1972  Ave et al. ............................. 204/146

Primary Examiner—M. J. Andrews
Attorney, Agent, or Firm—Jack Schuman; Barry R. Blaker; Lawrence A. Chaletsky

[57] ABSTRACT

Disclosed is a process for recovering valuable metals from scrap including the steps of melting the initial scrap feed, carburizing the melt, solidifying the carburized melt, and recovering the valuable metals from the resultant material by an appropriate acid leaching step.

15 Claims, 1 Drawing Figure

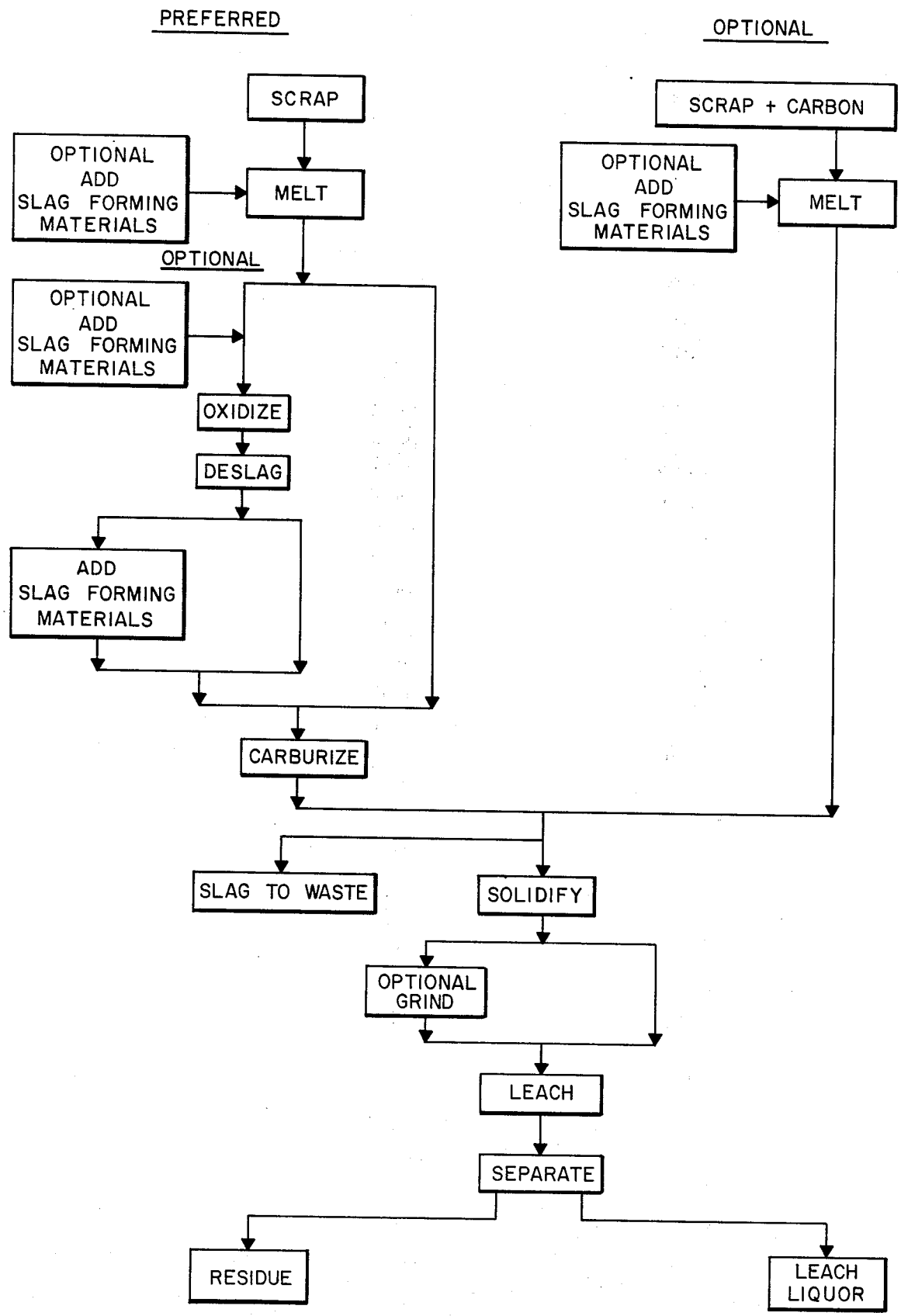

PROCESS FOR RECOVERING VALUABLE METALS FROM SUPERALLOY SCRAP

FIELD OF THE INVENTION AND PRIOR ART

The present invention relates generally to dissolution of certain metal scraps and is more particularly concerned with an acid leach method for non-electrolytically dissolving metal scraps containing the combination of (a) a metal chosen from the group consisting of cobalt, nickel and mixtures thereof and (b) a refractory metal chosen from the group consisting of molybdenum, chromium, tungsten and mixtures thereof.

In recent years the use of so-called "superalloys" has burgeoned due to need for wares having the special properties afforded by these materials, such as high temperature strength, high temperature oxidation resistance, corrosion resistance and the like. As the use of these superalloys grows so does the amount of scrap and other wastes containing them. The usual superalloy scraps include such physically diverse items as spent and off-quality wires, turnings, grindings, pouring skulls, mold gates, flashings and waste products such as slimes, sludges and slags. Accordingly, for purposes of the present invention, the term "scrap" is intended to include, but not be limited to, any and all of the various forms mentioned above.

In view of the fact that metal scraps of the foregoing types contain metals of substantial commercial value, there presently exists a clear need for suitable methods by which such scraps may be treated so as to recover at least certain of the metal values therefrom in commercially usable forms. Those metal scraps comprising substantial quantities of the superalloys usually contain significant quantities of nickel and/or cobalt and various schemes have been proposed by which to recover these metal values from such scraps.

THE PRIOR ART

U.S. Pat. No. 3,649,487, Mar. 14, 1972, to Aue et al., discloses a process by which a metal scrap containing the combination of at least one base metal chosen from the group consisting of iron, nickel, cobalt and copper and at least one high melting point metal chosen from the group consisting of chromium, molybdenum and tungsten is electrolytically treated so as to recover the base metal values therefrom. Said method involves pretreatment of the metal scrap to convert the aforesaid high melting point metals to their carbides, borides, silicides, nitrides and/or phosphides. Then, the thusly pretreated metal scrap is anodically dissolved, at a potential of below 4 volts, in a neutral or acidic electrolyte composed of salts of a non-oxidizing acid. By virtue of the combination of the pretreating step and the maintenance of a low potential during electrolysis the dissolution of the metal scrap is disclosed to proceed in a manner whereby the base metals are dissolved and one or more thereof are ultimately deposited at the cathode while the high melting point metals remain essentially undissolved and are retained at the anode in the form of an anode slime or skeleton.

In U.S. Pat. No. 3,607,236, Sept. 21, 1971, to Brooks et al., there is disclosed a process in which superalloy metal scrap is dissolved by recycle percolation of chlorinated, hot aqueous hydrochloric acid through a bed of the scrap. After each pass the hydrochloric acid leach liquor is resaturated with chlorine gas. The disclosed dissolution process is only partially selective with respect to tungsten and is not selective with respect to the remaining metal values; thus, substantially all of the superalloy metal scrap is passed into solution in the leach liquor. The pregnant leach liquor of this dissolution is treated by various carbon adsorption, filtration, solvent extraction, stripping, oxidation and selective precipitation techniques in order to separate and recover tungsten, molybdenum, iron, cobalt, chromium and nickel values.

U.S. Pat. No. 3,544,309, Dec. 1, 1970, to Fletcher et al., discloses a method in which nickel alloy scrap is dissolved in aqueous hydrochloric acid. The chromium, iron, cobalt and nickel values in the pregnant leach liquor are isolated and separated by a series of precipitation steps using mangesium oxide and by a solvent extraction step. Hydrochloric acid and mangesium oxide are ultimately reconstituted in the Fletcher et al. process and these agents are recycled to the dissolution and precipitation stages thereof. It is significant that patentees admonish the practitioners of the invention to avoid any pretreatment of the metal scrap which would increase the carbon or nitrogen content thereof since such pretreatment is said to render the scrap insoluble.

Each of the above-mentioned processes is possessed of certain disadvantages which tend to reduce widespread commercial use thereof. For instance, the economics of the process of U.S. Pat. No. 3,649,487 are believed to be unattractive due to the electric power consumption requirements thereof and due to the attendant high capital and operating costs usually associated with operation of electrolysis cells. The processes of U.S. Pat. Nos. 3,607,236 and 3,544,309 do not result in any substantial separations of metal values during dissolution of the metal scraps and thus each requires a series of relatively complex and expensive post-dissolution processing steps to be performed on the pregnant leach liquor in order to achieve separations and recoveries of the metal values therefrom. Also, both the Brooks et al. and Fletcher et al. processes involve extreme solutioning conditions in order that they achieve reasonably rapid dissolutions of normally acid resistant alloys.

In accordance with the present invention, however, it has now been discovered that substantially selective and acceptably rapid dissolution of an initial scrap metal feed containing the combination of (a) at least one metal chosen from the group consisting of nickel, cobalt and mixtures thereof and (b) at least one refractory metal chosen from the group consisting of molybdenum, tungsten, chromium and mixtures thereof can be had by non-electrolytic acid leaching of specially prepared scrap.

OBJECTS OF THE INVENTION

It is, therefore, a principal object of the present invention to provide a novel non-electrolytic acid leach process for the dissolution of an initial scrap metal feed containing the combination of (a) at least one metal selected from the group consisting of cobalt, nickel and mixtures thereof and (b) at least one refractory metal selected from the group consisting of chromium, molybdenum, tungsten and mixtures thereof whereby the nickel and/or cobalt values of said scraps are predominantly passed into solution in the leach liquor while the refractory metal values thereof are predominantly retained in the leach residue.

It is another object of the invention to provide a non-electrolytic acid leach process for the dissolution of initial scrap metal feeds of the foregoing type and which feeds comprise alloys which are not normally soluble in aqueous acids.

It is still another object of the invention to provide a non-electrolytic acid leach process for the dissolution of initial scrap metal feeds of the foregoing type whereby the nickel and/or cobalt values thereof are predominantly dissolved and whereby the resulting leach liquor may be treated to win said nickel and/or cobalt values therefrom.

Other objects and advantages of the present invention will, in part, appear hereinafter and will, in part, be obvious.

SUMMARY OF THE INVENTION

In accordance with the present invention, an initial scrap metal feed containing the combination of (a) at least one metal selected from the group consisting of nickel, cobalt or mixtures thereof and (b) at least one refractory metal selected from the group consisting of chromium, molybdenum, tungsten and mixtures thereof is melted, an effective amount of carbon added to the melt and the thus carburized melt solidified causing the group (b) refractory metal content to form carbides. This carburized scrap feed is then non-electrolytically dissolved in an acid leach liquor whereby the nickel and/or cobalt values of the feed pass predominantly into the leach liquor while the carburized group (b) refractory metal values thereof remain predominantly as residue. The resulting dissolution products, comprising the leach liquor and the leach residue, may be separated from one another and each of said products thereafter treated in order to win desired metal values therefrom.

THE DRAWING

The drawing hereof is a schematic, diagrammatic flow sheet illustrating the process of the invention along with certain preferred embodiments thereof.

DESCRIPTION OF PREFERRED EMBODIMENTS

As mentioned previously, the initial scrap feed in the practice of the present invention generally includes any metal scrap containing the combination of:

(a) at least one metal selected from the group consisting of nickel, cobalt and mixtures thereof; and (b) at least one refractory metal selected from the group consisting of chromium, molybdenum, tungsten and mixtures thereof.

The initial scrap metal feeds of interest can include a variety of compositions either through design or chance and can comprise, for example, mechanical mixtures of one or more of the following: nickel base alloys, cobalt base alloys, steels and iron alloys, magnet alloys, nickel-copper alloys, aluminum alloys and the like.

Of special interest are those initial scrap metal feeds containing substantial quantities of the so-called cobalt or nickel base alloys, particularly superalloys. Superalloys normally have relatively low iron contents of less than about 40 weight percent and are often resistant to attack and dissolution by aqueous acid leach liquors under non-extraordinary conditions. Such cobalt or nickel base superalloys are exemplified, for instance, by alloys conforming to AMS specifications; 5536G, 5532B, 5608 and to ASME Code Cases 1642-2 and 1410-4. Of particular interest are those initial scrap metal feeds which, upon melting, yield a molten mass comprising, just prior to solidification, a minimum of about twenty-five weight percent nickel plus cobalt and at least eight weight percent of one or more of the group (b) refractory metals as previously defined.

It should be recognized, of course, that the starting material scraps can also comprise various metal or metalloid values (in elemental or chemically combined forms such as oxides) in addition to the specific metals of groups (a) and (b) required in the practice of the invention. Thus, suitable starting material scraps may also contain, for example, one or more elements, alloys or compounds of: magnesium, iron, boron, aluminum, yttrium, lanthanum, silicon, titanium, zirconium, hafnium, vanadium, columbium, manganese, copper and the like.

Depending upon the precise nature of the initial scrap metal feed, its composition and the sources of its components, it is also contemplated that practice of the present invention can often be beneficially affected when, preliminary to treatment in accordance with the invention, the scrap metal feed is subjected to conventional scrap metal cleansing procedures such as degreasing and grit removal.

Carburization of the group (b) refractory metal content of a suitable initial scrap feed may be had by melting the feed, with or without a slag, by any suitable process such as electric arc furnace or induction furnace melting. Carbon is then introduced into the resulting molten metal bath by any suitable method, such as by the injection of graphite or coke into the molten metal bath using an inert gas carrier, such as argon. Alternatively, the carbon addition can also be carried out by adding carbon in a teeming ladle during tapping of the molten scrap. Yet another generally suitable carbon addition technique resides in providing sufficient carbon in the initial scrap metal feed prior to melting thereof. This can be done, for instance, by adding carbon to the initial feed prior to melting or by appropriate preselection and blending of two or more different metal scraps wherein one or more of said scraps already contains sufficient carbon to result in carburization of the group (b) refractory metals content of the resulting composite initial scrap feed. Employing any of these techniques, therefore, there results a molten metal bath containing carbon dissolved therein. Carburization of the group (b) refractory metals, of course, occurs upon solidification of this carbon-containing molten bath, the carbides forming as a discrete phase within the group (a) matrix metal.

Solidification of the molten bath may be conducted in combination with a teeming step, such as, pigging or ingot casting. However, it is generally convenient and economic to solidify the heat by conventional shotting or atomization techniques whereby the solidified carburized metal feed is rendered into at least relatively small particulate form whereby substantial contact area of the solidified carburized feed is thus made available to the acid leach solution. This improves the efficiency of the leaching step. The particular solidification technique chosen will usually depend upon available equipment, economics and subsequent processing steps contemplated. It is additionally contemplated that, before leaching, one may also reduce the particle size of the solidified carburized feed by grinding or any other comminution method known in the art.

Important roles played by carburization of the group (b) refractory metals in the practice of the invention are (1) to convert the chromium, molybdenum and tungsten refractory metal values of the initial scrap metal feed into one or more discrete carbide phases which are predominantly insoluble in the subsequent acid leach treatment, and (2) at least in the case of those initial scrap metal feeds containing one or more alloys which are normally highly resistant to attack and solution by acid leach liquors, to fundamentally alter the character of such alloys as to render the matrix phase cobalt and nickel values arising from the carburization soluble in the acid leach liquor to be subsequently employed. Accordingly, the minimum amount of carbon effective to produce these two results represents the minimum quantity of carbon to be present in the molten scrap metal bath.

Although there is no intent to be bound by the following discussion, it is believed that the minimum effective quantity of carbon required to be present in the molten scrap metal bath for any given set of circumstances will be governed, at least in large part, by: (1) the overall composition of the starting scrap metal, particularly the group (b) refractory metal contents thereof; and (2) the acid leach liquor contemplated for dissolution of the carburized product. For instance, it is believed that, generally, the less the corrosiveness of the contemplated leach liquor, the greater need be the carbon content of the carburized scrap. Similarly, the greater the overall group (b) refractory metals content of the starting scrap, the larger the quantity of carbon required. Bearing the above in mind, therefore, a carbon content of the carburized solidified scrap metal feed of between about 0.5 and 6.0 weight percent carbon will usually be found to be effective within the terms of the invention. For purposes of the present invention, it should be noted and understood that carburization of the scrap metal starting material need not result in the conversion of the refractory metals content of group (b) solely to their simple corresponding carbides but also will usually result in at least some conversion of said refractory metals to more complex carbide forms. For instance, where chromium, molybdenum, nickel and cobalt are present in the metal scrap, at least one of various types of carbides containing two or more of these elements, in combination, may be formed.

As mentioned previously, the initial scrap metal feed can also contain significant oxidized or oxidizable metal values of metals other than those specifically required thereof such as, aluminum, silicon, magnesium, boron, yttrium, lanthanum, titanium, zirconium, hafnium, vanadium, columbium, tantalum and manganese. The winning of these oxidizable metal values may be undesired due to their relatively low commercial worth, their presence in insufficient concentration to be of commercial interest or the presence of which metal values in the leach liquor or leach residue products of the invention could lead to difficulties in whatever subsequent treatments or winning processes may be contemplated for said leach liquor or leach residue products. Accordingly, in a preferred embodiment of the invention, the presence of at least some of these oxidizable metal values in the solidified carburized scrap metal feed is avoided or diminished by one or more optional oxidizing steps accomplished between the melting and carburizing steps. Said oxidizing step may be performed by any suitable technique conventional in the art. For example, oxygen may be injected into the molten initial scrap metal feed bath via a lance and in the presence of a lime bearing slag. Employing this technique the oxidizable metal values migrate from the molten metal and are combined into the slag. Then, they may be removed by slagging-off. If desired, a new protective slag may then be provided prior to commencement of the carburizing step.

Dissolution of the carburized and solidified scrap metal feed is achieved by leaching of said feed with substantially any aqueous acid leach liquor capable of attacking and dissolving elemental cobalt and nickel. Such acid leach liquors are generally exemplified by aqueous acids such as hydrochloric, perchloric, nitric, sulfuric or phosphoric acids. Of these, aqueous hydrochloric and sulfuric acids are generally preferred as the leach liquors due to their ready availability and economy and due to the fact that various processes for winning of nickel and/or cobalt values from aqueous sulfate and chloride solutions thereof are known and practiced. The concentration of the aqueous acid leach liquor is also generally not critical provided, of course, that said concentration be sufficient to achieve solution of the elemental cobalt and/or nickel values of the carburized metal scrap. Contact of the acid leach liquor with the carburized scrap may desirably be undertaken under conditions of agitation, elevated temperature and/or elevated pressure so as to foster rapid dissolution of the cobalt and/or nickel values thereof.

For illustrative purposes concerning the practice of the present invention and certain of the preferred embodiments thereof, there follow a number of non-limiting examples.

EXAMPLE 1

An initial scrap metal feed was prepared and melted down in an electric arc furnace. Said initial scrap metal feed consisted of 1,000 pounds of miscellaneous hard metal scrap, 11,000 pounds or grindings, 909 pounds of other miscellaneous materials, 480 pounds of burnt lime (CaO) and 300 pounds of fluorospar ($CaF_2$). The grindings forming part of the initial scrap metal feed were obtained from grinding operations and consisted of a mixture of metal particles and grinding wheel debris. In the preparation and melting steps, all of the hard scrap and a portion of the grindings were charged into the furnace prior to startup of the heating operation. The balance of the grindings, the lime and the fluorospar were added to the furnace during the melt down of this preliminary charge. A sample of the resulting molten metal bath was taken which analyzed 0.63 weight % carbon. Most, but not all, of the slag was then removed. Some oxidation of highly oxidizable elements contained in the scrap usually occurs during melt down and the resulting oxides generally report to and are thus removed with the slag. The temperature of the bath was adjusted to about 3050° F. and oxygen was injected into the bath at a pressure of about 70 p.s.i. for five minutes by means of a refractory covered, one-half inch diameter, iron pipe lance. A sample of the molten metal bath was again taken which analyzed 0.33 weight % carbon. The balance of the slag was then removed and replaced with a new slag consisting of 200 pounds of fluorospar and 80 pounds of burnt lime.

Next, about 350 pounds of graphite powder was injected into the scrap metal bath by means of a ceramic covered iron pipe lance and employing argon as the carrier fluid. A small amount of fluorospar was then added in order to aid in fluidizing the slag.

A sample of the scrap metal bath was then taken which analyzed 2.78 weight % C. An additional 75 pounds of graphite was then injected into the bath in the manner previously described and the bath resampled. The carbon content of this sample was 3.21 weight %. The temperature of the bath was then adjusted to about 2650° F. and the heat tapped into the teeming ladle, an additional 20 pounds of graphite being added to the teeming ladle during said tapping step.

Water jets were used to break up the teem stream as the heat was teemed into a water filled pit. The resulting shotted carburized scrap metal product was washed, dried, and screened. Seven thousand six hundred ninety-eight (7,698) pounds of retained shot and 2,365 pounds of undersize were recovered from the screening operation. Of the original scrap metal charge, spills amounted to about 90 pounds and skulls were roughly estimated to be about 200 pounds.

Exclusive of the burnt lime and fluorospar components, a total of 13,354 pounds of hard metal scrap, grindings, miscellaneous other materials and graphite were added to the bath. About 10,353 pounds of scrap metal as retained shot product, undersize, spills and skulls were recovered. The difference between the total original charge weight and that of the total recovered metal is due to grinding wheel debris which is included in the original charge weights but which debris reports to the slag, losses of carbon due to oxidation, losses of readily oxidizable scrap metal elements such as aluminum and silicon to the slag, metal entrained in the slag, as well as other usual losses and measurement errors.

The composition of the shot product was determined from a teem stream sample and is given in TABLE 1—1. The low value reported for the silicon is a good indication that the preparation and treatment of the initial scrap metal feed was effective in removing readily oxidizable elements such as silicon and aluminum which are usually present.

TABLE 1-1

| COMPOSITION OF SCREENED SHOT | |
|---|---|
| Element | Weight % |
| C | 3.37 |
| Cb (Nb) | <.10 |
| Co | 5.15 |
| Cr | 11.35 |
| Cu | 1.19 |
| Fe | 23.69 |
| Mn | .30 |
| Mo | 10.00 |
| Ni | 42.47 |
| P | .023 |
| S | .115 |
| Si | .01 |
| W | 1.50 |

One hundred (100) grams of the screened shot and 400 ml. of 20 weight % aqueous HCl leach liquor were placed in a flask fitted with a condenser. The liquor was boiled for 24 hours, the contents of the flask filtered, and distilled water added to the liquor filtrate in order to bring the volume thereof up to 500 ml. This diluted leach liquor was then analysed, the results of which analysis are given in TABLE 1-2, following.

TABLE 1-2

| COMPOSITION OF LEACH LIQUOR | |
|---|---|
| Element | gms/l. |
| Fe | 21.80 |
| Ni | 72.60 |
| Co | 8.58 |
| Cr | 4.35 |
| Mo | 0.24 |
| W | 0.10 |

TABLE 1-2-continued

| COMPOSITION OF LEACH LIQUOR | |
|---|---|
| Element | gms/l. |
| Normality (HCl) | 0.3 N |

From the compositions of the shot (TABLE 1—1) and leach liquor (TABLE 1-2) the percentages of various elements of the initial scrap metal feed which reported to and dissolved in the leach liquor are calculated. These results are given in TABLE 1-3, following.

TABLE 1-3

| INITIAL SCRAP METAL FEED ELEMENTS DISSOLVED IN LEACH LIQUOR | | | |
|---|---|---|---|
| Element | Gms/100 Gms Shot | Gms/500 ml. of Leach Liquor | Weight % of Element in Leach Liquor |
| Fe | 23.69 | 10.9 | 46.0 |
| Ni | 42.47 | 36.3 | 85.5 |
| Co | 5.15 | 4.29 | 83.3 |
| Cr | 11.35 | 2.18 | 19.2 |
| Mo | 10.00 | .12 | 1.2 |
| W | 1.50 | .05 | 3.3 |

It is apparent from examination of TABLE 1-3 that dissolution of nickel and cobalt in the leach liquor proceeds to a substantially greater extent than does the dissolution of chromium, molybdenum or tungsten.

EXAMPLE 2

Forty pounds of an initial scrap feed was charged into an air induction furnace and melted down. A chemistry sample weighing 0.26 lbs. and hereinafter identified as XRS-1 was obtained. Another sample of the molten bath was cast in the form of a rod and is hereinafter identified as R1. This rod weighed 0.36 pounds and was ⅜" in diameter. Herein the term "sample" is used in the sense of all metal cast at the same time and given the same number. All "R" samples are in the form of rods. In practice, therefore, some of the samples consisted of several distinct pieces of metal.

One pound of nickel oxide (NiO) and one pound of a prefused slag consisting of 3 parts by weight CaO, 1 part by weight $CaF_2$ and 1 part by weight $Al_2O_3$ was added and the bath thereafter held at a temperature of slightly above 2800° F. for five minutes. The slag was then removed and a chemistry sample, XRS-2, and a cast rod sample weighing 0.44 pounds and hereinafter identified as R2 were each obtained from the molten metal bath. Next, carbon was added incrementally to the molten bath remaining in the furnace. Each such incremental addition was accomplished by stirring in ¼ pound of graphite into the molten bath. Subsequent to each carbon addition and prior to the next, a cast rod sample and, in certain instances, a chemistry sample were obtained. Identification of the chemistry and rod samples, cross-referenced to the particular stage of the procedure from which they were obtained, as well as the weight of each rod sample and the result of carbon analysis thereof are presented in TABLE 2-1, following.

TABLE 2-1

IDENTIFICATION OF SAMPLES

| Stage of Procedure | Chemistry Sample Ident. | Rod Sample Ident. | Weight (lbs.) | Carbon (wt. %) |
|---|---|---|---|---|
| Initial Scrap Metal | | | | |
| Feed After Melt Down Initial Scrap Metal | XRS-1 | R1 | 0.36 | 0.08 |
| Feed After Slagging-off | XRS-2 | R2 | 0.44 | 0.08 |
| Scrap Metal Feed After Incremental Carbon Addition Step No. | | | | |
| 1 | None | R3 | 0.26 | 1.39 |
| 2 | None | R4 | 0.17 | 2.61 |
| 3 | None | R5 | 0.38 | 3.02 |
| 4 | None | R6 | 1.01 | 3.37 |
| 5 | XRS-3 | R8 | 1.20 | 3.79 |
| 6 | None | R10 | 0.68 | 4.19 |
| 7 | None | R12 | 0.95 | 4.34 |
| 8 | XRS-4 | R14 | 0.72 | 4.81 |

The XRS chemistry samples were each analyzed and the results of said analyses are listed in TABLE 2—2.

TABLE 2-2

COMPOSITION OF CHEMISTRY SAMPLES (VALUES IN WEIGHT %)

| Element | XRS-1 | XRS-2 | XRS-3 | XRS-4 |
|---|---|---|---|---|
| Al | 0.12 | <.01 | <.01 | .02 |
| B | <.002 | <.002 | | |
| C | .09 | .09 | 3.73 | 4.71 |
| Co | 2.02 | 2.05 | 2.06 | 2.03 |
| Cr | 20.76 | 20.37 | 20.66 | 21.62 |
| Cu | 0.20 | 0.21 | | |
| Fe | 18.53 | 18.51 | 18.50 | 18.17 |
| Mg | 0.017 | 0.017 | | |
| Mn | 0.56 | 0.51 | .52 | 0.50 |
| Mo | 8.77 | 8.73 | 9.02 | 9.02 |
| Ni | 47.59 | 48.58 | 48.73 | 47.65 |
| P | 0.020 | 0.024 | | |
| S | <.005 | <.005 | | |
| Si | 0.46 | 0.23 | 0.10 | 0.09 |
| Ti | 0.01 | <.01 | | |
| V | 0.04 | .05 | | |
| W | 0.58 | 0.65 | 0.53 | 0.67 |
| Zr | 0.01 | 0.01 | | |

Examination of TABLE 2—2 reveals that aluminum and silicon were each substantially removed during treatment of the initial scrap mix in accordance with the invention.

Ten to fourteen gram portions of each rod sample were placed in separate glass flasks fitted with condensers along with one liter each of 20 weight % aqueous HCl leach liquor. The resulting scrap/leach liquor systems were then boiled for 24 hours, cooled, the contents filtered and sufficient distilled water added to the leach liquor filtrates to make each up to its original one liter volume. The weight of each specific rod sample employed in the various leach systems of this example and the analyses of the compositions of the various resulting leach liquor products are reported in TABLE 2-3, following.

TABLE 2-3

ANALYSES OF LEACH LIQUORS (VALUES IN GRAMS/LITER)

| Sample No. | Rod Wt. (gms) | Al | Co | Cr | Fe | Mn | Mo | Ni | Si | W | Cl⁻ | H+ |
|---|---|---|---|---|---|---|---|---|---|---|---|---|
| R1 | 13.15 | Nil | .04 | .57 | .51 | .01 | .25 | 1.29 | .03 | .019 | 208.0 | 5.69 |
| R2 | 12.80 | Nil | .04 | .59 | .54 | .01 | .25 | 1.41 | .03 | .020 | 210.6 | 5.65 |
| R3 | 11.71 | Nil | .20 | 1.38 | 1.99 | .04 | .38 | 5.51 | .02 | .035 | 226.6 | 5.58 |
| R4 | 12.03 | Nil | .19 | .74 | 1.85 | .03 | .13 | 5.56 | .03 | .017 | 217.5 | 5.55 |
| R5 | 10.30 | Nil | .16 | .64 | 1.59 | .03 | .12 | 4.76 | .03 | .016 | 210.6 | 5.62 |
| R6 | 12.67 | Nil | .17 | .39 | 1.72 | .03 | — | 5.64 | .03 | .010 | 206.0 | 5.40 |
| R8 | 13.82 | Nil | .16 | .32 | 1.62 | .03 | — | 5.53 | .03 | .007 | 207.2 | 4.95 |
| R10 | 11.39 | Nil | .11 | .22 | 1.19 | .02 | .03 | 4.16 | .03 | .004 | 205.9 | 5.51 |
| R12 | 12.11 | Nil | .14 | .37 | 1.43 | .02 | .09 | 4.81 | .03 | .014 | 215.4 | 5.62 |
| R14 | 13.26 | Nil | .18 | .47 | 1.72 | .03 | .10 | 5.76 | .03 | .015 | 206.2 | 5.46 |

The percentages of the rod sample elements dissolved in the leach liquors are listed in TABLE 2-4. The compositional analysis of sample XRS-2 was used as the basis in calculating the weight percentage of each of the analyzed original rod sample elements which reported to the leach liquor.

TABLE 2-4

WEIGHT PERCENTAGES OF ROD SAMPLE ELEMENTS DISSOLVED IN LEACH LIQUORS

| Leach Liquor of Rod Sample No. | Content Carbon of Rod Sample (wt %) | Co | Cr | Fe | Mn | Mo | Ni | W |
|---|---|---|---|---|---|---|---|---|
| R1 | 0.08 | 14.8 | 21.3 | 21.0 | 14.9 | 21.8 | 20.2 | 22.2 |
| R2 | 0.08 | 15.2 | 22.6 | 22.8 | 15.3 | 22.4 | 22.7 | 24.0 |
| R3 | 1.39 | 83.3 | 57.9 | 91.8 | 67.0 | 37.2 | 96.9 | 46.0 |
| R4 | 2.61 | 77.0 | 30.2 | 83.1 | 48.9 | 12.4 | 95.1 | 21.7 |
| R5 | 3.02 | 75.8 | 30.5 | 83.4 | 57.1 | 13.4 | 95.1 | 23.9 |
| R6 | 3.37 | 65.4 | 15.1 | 73.3 | 46.4 | — | 91.6 | 12.1 |
| R8 | 3.79 | 56.5 | 11.4 | 63.3 | 42.6 | — | 82.4 | 7.8 |
| R10 | 4.19 | 47.1 | 9.5 | 56.4 | 34.4 | 3.0 | 75.2 | 5.4 |
| R12 | 4.34 | 56.4 | 15.0 | 63.8 | 32.4 | 8.5 | 81.8 | 17.8 |
| R14 | 4.81 | 66.2 | 17.4 | 70.1 | 44.4 | 8.6 | 89.4 | 17.4 |

The beneficial effect of the melting-carburizing-solidification treatment of the invention in promoting the separation of nickel and cobalt from chromium, molybdenum and tungsten is evident from an examination of TABLE 2-4. Prior to completion of said treatment (leach liquors of samples R1 and R2) it is seen that, with the exception of the elements cobalt and manganese, the percentages of the other rod sample elements going into solution in the leach liquors are approximately equivalent. This suggests each of the R1 and R2 samples dissolved relatively uniformly. In contrast, the carburized and solidified rod samples (R3-R14) yielded much higher nickel, cobalt, and iron percentages going into solution than those of chromium, molybdenum and tungsten. Samples R1 and R2 contain 0.08% carbon while all other samples contain over 1.3% carbon.

It is also noteworthy that, in general, the quantities of nickel, cobalt and iron of the initial scrap metal feed which went into solution in the leach liquors for samples R1 and R2 were substantially less than those of the carburized samples. This is because the uncarburized R1 and R2 samples were significantly more resistant to attack by the acid leach liquor. In striking contrast, the matrix phase elements (Fe, Co, Ni) of the carburized initial scrap feed samples were predominantly dissolved. Further confirmation of this was had by visual examination of the R1 and R14 samples after leaching thereof. The R1 sample, after leaching, had a metallic appearing surface covered with large pits. The R14 sample, on the other hand, had a dull surface appearance but appeared to retain its original overall size and shape. Transverse sections of the two leached rod samples were prepared and subjected to metallographic examination by standard techniques. The unetched R1 sample had a bright mettalic appearance. The size of the sample was diminished where there was a pit. The unetched R14 sample had a small central core having a bright metallic appearance surrounded by a large dull region which extended to the original boundary of the sample. This dull region is suggestive of a carbide network which remained after the matrix phase, containing iron, nickel and cobalt, was dissolved by the acid leach liquor. Accordingly, the results of the present example indicate that the melting-carburizing-solidifying treatment forming a part of the present invention can provide at least two highly beneficial effects. Firstly, it promotes the separation of nickel, cobalt and, if present, iron from chromium, molybdenum and tungsten. Secondly, said treatment can substantially reduce the acid resistance of a normaly acid-resistant scrap alloy and thus render the matrix phase elements of the treated alloy substantially more susceptible to attack and dissolution by the acid leach liquor.

EXAMPLE 3

Ninety (90) pounds of an initial scrap metal feed were melted in an induction furnace, the temperature of the resulting molten bath raised to 2760° F. and a chemistry sample of the molten metal (Sample A) obtained. Nickel oxide, NiO, was slowly added to the bath in the amount of 3.4 pounds. About five minutes after completion of the nickel oxide addition the resulting surface slag or scum was removed from the bath and a chemistry sample of the molten metal, Sample B, obtained. The temperature of the bath was then lowered to and maintained at between about 2680° F. and 2490° F. for the balance of the heat. In a manner similar to that employed in Example 2, incremental additions of graphite were made to the bath, each addition being followed by sampling of the molten metal. The carbon addition technique employed in the present example differed from that of Example 2 in the respects that varying quantities of graphite were added at each incremental addition and that, in certain instances, the quantities of the molten metal samples obtained and some of the types of cast specimens produced therewith were different. In the present example, certain of the molten metal samples obtained each weighed approximately five pounds and were cast into slab specimens in a graphite mold. Overall, fourteen cast specimens were obtained and serially numbered from 1 through 14, cast specimen No. 1 being obtained prior to the first carbon addition. A chemistry sample, Sample C, was obtained from the molten bath after the last graphite addition and after cast specimen No. 14 was obtained.

The analyses of the chemistry samples are reported in TABLE 3-1. The fourteen cast specimens were analyzed for carbon, the results of which analyses are reported in each of TABLES 3-2 and 3—3.

Pieces of each cast specimen (except No. 1) were separately comminuted to 45×D mesh (Tyler) in a steel mortar and pestle. About 40 grams of each comminuted specimen were placed in separate flasks equipped with condensers along with 400 ml. per flask of a 20 weight percent aqueous HCl solution. The contents of the flasks were then boiled for approximately four hours, cooled, filtered, and sufficient distilled water added to each leach liquor filtrate to bring the volume thereof to 500 ml.

The leach liquors were then quantitatively analyzed, the results of which analyses are reported in TABLE 3-2. Then, considering the metal analysis of chemistry Sample B (TABLE 3-1) as representative of the various metal contents of the cast sample specimens, the weight percents of Ni, Co, Fe, Cr, W, and Mo which reported to the leach liquors from said specimens were calculated. The results of these calculations are tabulated in TABLE 3—3. As is evident from an examination of said TABLE 3—3, the addition of carbon to the molten initial scrap mix serves to promote separation of nickel and cobalt from chromium, molybdenum and tungsten upon acid leaching of the solidified, carburized scrap mix.

TABLE 3-1

COMPOSITION OF CHEMISTRY SAMPLES
(Values in Weight %)

| Element | SAMPLE IDENT. | | |
|---|---|---|---|
| | A | B | C |
| Al | 0.01 | 0.01 | 0.01 |
| B | 0.001 | 0.001 | 0.001 |
| C | 0.09 | 0.09 | 5.00 |
| Ca | 0.005 | 0.005 | 0.005 |
| Cb | 0.90 | 0.83 | 0.81 |
| Co | 19.10 | 19.67 | 18.35 |
| Cr | 21.05 | 20.13 | 19.12 |
| Cu | 0.09 | 0.11 | 0.10 |
| Fe | 30.24 | 30.44 | 28.84 |
| Mg | 0.01 | 0.01 | 0.01 |
| Mn | 1.05 | 0.71 | 0.67 |
| Mo | 2.87 | 2.85 | 2.88 |
| N | 0.137 | 0.138 | 0.022 |
| Ni | 19.97 | 21.23 | 20.12 |
| P | 0.018 | 0.018 | 0.005 |
| S | 0.005 | 0.005 | 0.005 |
| Si | 0.51 | 0.39 | 0.10 |
| Ta | 0.05 | 0.05 | 0.05 |
| W | 2.39 | 2.36 | 2.57 |
| Zr | 0.01 | 0.02 | 0.02 |

TABLE 3-2

ANALYSES OF LEACH LIQUORS
(Values in Grams/Liter)

| Specimen No. | Carbon Content of Specimen (Wt %) | Element | | | | | |
|---|---|---|---|---|---|---|---|
| | | Co | Cr | Fe | Mo | Ni | W |
| 1 | .09 | — | — | — | — | — | — |
| 2 | 1.16 | 13.10 | 10.57 | 19.2 | 0.74 | 13.88 | 0.13 |
| 3 | 1.67 | 14.00 | 10.31 | 20.3 | 0.64 | 14.89 | 0.11 |
| 4 | 2.19 | 13.40 | 8.67 | 19.5 | 0.62 | 14.69 | 0.07 |
| 5 | 2.76 | 12.10 | 7.55 | 17.4 | 0.45 | 13.58 | 0.07 |
| 6 | 2.95 | 11.30 | 6.30 | 16.0 | 0.45 | 12.68 | 0.04 |
| 7 | 3.21 | 12.70 | 6.50 | 17.8 | 0.47 | 14.89 | 0.04 |
| 8 | 3.39 | 11.60 | 5.58 | 16.2 | 0.40 | 13.68 | 0.03 |
| 9 | 3.63 | 11.60 | 5.38 | 16.1 | 0.38 | 13.78 | 0.03 |
| 10 | 3.88 | 11.60 | 5.25 | 15.9 | 0.38 | 13.88 | 0.02 |
| 11 | 4.10 | 11.60 | 5.12 | 15.7 | 0.36 | 13.98 | 0.05 |
| 12 | 4.40 | 10.70 | 4.60 | 14.4 | 0.35 | 13.18 | 0.06 |
| 13 | 4.46 | 11.50 | 4.92 | 15.4 | 0.37 | 14.18 | 0.05 |
| 14 | 5.09 | 11.20 | 4.73 | 15.1 | 0.36 | 13.48 | 0.06 |

TABLE 3-3
WEIGHT PERCENTAGES OF ELEMENTS OF SPECIMENS DISSOLVED IN LEACH LIQUORS

| Specimen No. | Carbon Content of Specimen (Wt %) | Ni | Co | Fe | Cr | W | Mo |
|---|---|---|---|---|---|---|---|
| 1 | 0.09 | — | — | — | — | — | — |
| 2 | 1.16 | 84.04 | 86.18 | 80.97 | 67.39 | 6.58 | 32.23 |
| 3 | 1.67 | 90.08 | 92.11 | 85.61 | 65.73 | 5.57 | 27.87 |
| 4 | 2.19 | 88.88 | 88.16 | 82.24 | 55.29 | 3.54 | 27.00 |
| 5 | 2.76 | 82.22 | 79.61 | 73.38 | 48.15 | 3.54 | 20.03 |
| 6 | 2.95 | 76.78 | 74.34 | 67.48 | 40.13 | 2.02 | 20.03 |
| 7 | 3.21 | 90.08 | 83.55 | 75.07 | 41.40 | 2.02 | 20.91 |
| 8 | 3.39 | 82.83 | 76.32 | 68.32 | 35.54 | 1.52 | 17.42 |
| 9 | 3.63 | 83.43 | 76.32 | 67.90 | 34.27 | 1.52 | 16.55 |
| 10 | 3.88 | 84.04 | 76.32 | 67.05 | 33.50 | 1.01 | 16.55 |
| 11 | 4.10 | 84.64 | 76.32 | 66.21 | 32.61 | 2.53 | 15.68 |
| 12 | 4.40 | 79.81 | 70.39 | 60.73 | 29.30 | 3.04 | 15.68 |
| 13 | 4.46 | 85.85 | 75.66 | 64.95 | 31.34 | 2.53 | 16.55 |
| 14 | 5.09 | 81.62 | 73.68 | 63.68 | 30.19 | 3.04 | 15.68 |

EXAMPLE 4

A portion of the cast rod Sample R14 (4.81 wt.% C) of Example 2 was ground to −100 mesh (Tyler) employing a steel mortar and pestle. Ten grams of this ground, carburized scrap metal feed sample were placed in a flask fitted with a condenser along with 100 ml. of 10 N sulfuric acid. The flask was placed on a hot plate and the leach liquor contents boiled for about three hours and forty-five minutes, with continuous air sparge thereof. The leach liquor was then allowed to cool to room temperature and filtered.

The leach liquor filtrate was subjected to quantitative analyses for Cr, Mo and Ni and it was found that said filtrate contained 2.86 gm/liter of chromium, 0.90 gm/liter of molybdenum, and 34.31 gm/liter of nickel. The $H_2SO_4$ concentration of the leach liquor filtrate was determined to be 6.62 N. No analyses were undertaken in respect of any other elements which may have been contained in said leach liquor filtrate.

As in Example 2, the metal analysis of the XRS-2 chemistry sample of Example 2 (TABLE 2—2) was taken as representative of the metals content of the comminuted R14 sample herein prior to leaching thereof. The weight percentages of the elements of the original scrap which reported to the leach liquor were thus calculated to be 11.8 Cr, 8.7 Mo and 59.3 Ni, respectively. The dissolved chromium and nickel percentages realized in the present example are somewhat lower than those obtained in Example 2 and are believed to be probably due to incomplete reaction of the comminuted R14 sample with the sulfuric acid leach liquor. This view is supported upon comparison of the dissolved nickel to chromium weight ratio realized with Sample R14 of Example 2, dissolved in hydrochloric acid leach liquor against that obtained with the sulfuric acid leach liquor of the present example. In Example 2 this ratio is 12.3 while in the present example said ratio is 12.0. The incomplete reaction in the present example is believed due, at least in part, to incomplete contact of the ground rod sample with the leach liquor. Foaming of the acid leach liquor was noted to have occurred during the leaching step of the present example and an appreciable amount of the ground sample was evidently deposited on the side of the flask at above the level of boiling leach liquor.

Nevertheless, the beneficial effect of carburization of the initial scrap metal feed in fostering separation of nickel from chromium upon acid leaching of the feed is illustrated by this example as is the use of aqueous sulfuric acid solution as an acceptable leach liquor.

EXAMPLE 5

An initial metal feed bath was prepared by melting 52 pounds of a scrap metal material having a carbon content of about 3.76 weight percent and 8.4 pounds of a scrap metal material having a carbon content of less than 0.15 weight percent in an induction furnace. The temperature of the resulting molten metal bath was raised to 2510° F. and a chemistry sample obtained therefrom. Additional bath samples were then cast in the form of rods. The chemistry sample was analyzed and its composition is reported in TABLE 5-1 hereof. The carbon content of a rod sample was determined to be 3.28 weight percent. In view of this substantial original carbon content of the molten metal bath, no further carbon additions were made to the bath preparatory to solidification and leaching. A piece of one of the rod samples was ground to −80 mesh (Tyler) in a mortar and pestle. A 40 gram portion of this ground cast rod sample was charged, along with 400 ml. of 10N $H_2SO_4$, into a flask fitted with a condenser. The acid leach liquor was then boiled for four hours while air was bubbled therethrough. After cooling, sufficient distilled water was added to the flask to make the leach liquor volume thereof up to 500 ml. and the diluted leach liquor then filtered from the leach residue. The leach liquor filtrate was analyzed, the results of which analysis are given in TABLE 5-2. The weight percentages of certain of the scrap elements which dissolved in the leach liquor were calculated based on the metal analysis of the chemistry sample and are also presented in TABLE 5-2. In this example the beneficial effect of the carburizing step in promoting separation of nickel and cobalt from chromium and molybdenum is illustrated. The use of aqueous sulfuric acid solution as a leach liquor is illustrated. A melt practice in which the carburizing carbon is already in the initial scrap metal feed at the time of melting is also illustrated.

TABLE 5-1
COMPOSITION OF CHEMISTRY SAMPLE
(Values in Weight %)

| | |
|---|---|
| Al | <0.01 |
| C | 3.23 |
| Co | 4.18 |
| Cr | 19.74 |
| Fe | 17.07 |
| Mn | 0.37 |
| Ni | 42.33 |
| S | <0.002 |
| Si | 0.33 |
| W | 1.11 |

TABLE 5-2

| | COMPOSITION OF LEACH LIQUOR (GM/LITER) | WEIGHT PERCENTAGES OF SCRAP ELEMENTS DISSOLVED IN LEACH LIQUOR |
|---|---|---|
| Co | 2.56 | 76.6 |
| Cr | 2.88 | 18.2 |
| Mo | 0.51 | 8.5 |
| Ni | over 33.0 | about 100.0 |
| $H_2SO_4$ Normality | 7.2 | |

Subsequent to the leaching step the resulting leach liquor can be physically separated from the leach residue by employment of any suitable conventional solid/- liquid separation technique such as centrifugation, filtration, decantation and the like. Thereafter, the leach liquor product can usually be employed as an original or adjunctive feedstock in various conventional nickel and cobalt metal ore refining or winning processes known in the art.

For instance, in the article, "Turbine Mixer Fundamentals and Scale-up Method at the Port Nickel Refinery," *Metallurgical Transactions B*, Volume 6B, March 1975, P. B. Queneau et al. described operations of a commercial refinery whereat nickel and cobalt are won from nickel-copper sulfide mattes. In FIG. 1 of this article, there is shown a block diagram of the interrelationships between unit operations at the Port Nickel refinery of American Metal Climax, Incorporated. Therein, the nickel and cobalt winning scheme is disclosed to make use, as a lixiviant, of the acidic copper sulfate electrolyte produced as a by-product in a separate and distinct copper electrowinning operation. This acidic electrolyte is simultaneously aerated and contacted with granulated nickel-copper sulfide matte, thereby to solubilize the nickel as sulfate therein and to reject, as solid residue, elemental copper and compounds of copper and iron. This rejection is disclosed to take place to the extent that, at the termination of the aeration leaching step, there results a nickel-containing leach liquor having a soluble iron and copper content of less than 5 parts per million. This leach liquor is then treated in order to separate the cobalt and nickel values and to recover them in metallic form. Accordingly, metal-containing sulfate leach liquors such as produced in Examples 4 and 5 of the present specification can generally be employed in the commercial nickel and cobalt winning process as disclosed in the Queneau et al. article. For example, where the soluble copper or iron content of the leach liquor product of the present invention is substantial, said liquor can be introduced into the atmospheric leach step of the winning process along with the acidic copper sulfate electrolyte. On the other hand, if the sulfate leach liquor product of the present invention is already of sufficiently low iron and copper content or is separately treated such as to remove iron, copper and any other undesirable metal values therefrom, said sulfate liquor product can then be introduced directly to the nickel-cobalt separation and recovery stage of the winning process disclosed in the article.

In another article entitled "The Falconbridge Matte Leach Process", P. G. Thornhill, E. Wigstol and G. Van Weert, *Journal of Metals*, The Metallurgical Society of AIME, July 1971, pages 3-18, there is disclosed a process by which nickel is won from nickel-copper sulfide matte by hydrochloric acid leaching of the matte. This leaching step is undertaken with hydrocloric acid of sufficient strength as to selectively dissolve the nickel component of the matte while rejecting copper and platinum values. The leach liquor is treated with an oxidizing agent to remove dissolved hydrogen sulfide and to convert iron to the ferric state. The iron values are then removed by solvent extraction of the liquor with tri-butyl-phosphate. The resulting iron-free liquor is next treated with tri-iso-octyl amine in order to remove cobalt and whatever residual dissolved copper may remain from the preceding solvent extraction step. Nickel chloride of good purity is then crystallized out of the liquor. Nickel metal, as the process is disclosed to be commercially practiced, is then produced by high temperature hydrolysis of the nickel chloride, thereby to result in elemental nickel product and HCl gas by-product, the latter being employed to regenerate acid for leaching of fresh matte. Alternative methods for producing elemental nickel from the nickel chloride are disclosed, such as by direct reduction or by electrowinning from electrolytes replenished by dissolution of the nickel chloride crystals. Thus, it appears that the process of the present invention, as embodied in Example 1 hereof, can result in a leach liquor product suitable for use as an original or adjunctive feedstock in the nickel winning method disclosed in the cited Thornhill et al. article.

Accordingly, it is intended and should be understood that the foregoing description and examples are illustrative in nature and that, therefore, numerous changes can be made in the materials, proportions and conditions specifically set forth therein without departing from the essential spirit of the invention as defined in the appended claims.

What is claimed is:

1. A method for treating certain metal scraps which comprises:
    providing an initial scrap metal feed containing the combination of (a) at least one metal selected from the group consisting of nickel, cobalt or mixtures thereof, and (b) at least one refractory metal selected from the group consisting of chromium, molybdenum, tungsten and mixtures thereof, said feed comprising at least one acid resistant alloy selected from the group consisting of cobalt and nickel base alloys;
    melt carburizing said feed sufficiently to at least predominantly insolubilize the metals of group (b) with respect to the aqueous acid leach step below and to render the group (a) metals of said acid resistant alloy contained in said feed soluble in said acid leach step; and
    non-electrolytically leaching the melt carburized feed with aqueous acid leach liquor having dissolving power for the metals of group (a), whereby said metals of group (a) pass predominantly into solution in said liquor while the metals of group (b) remain predominantly as undissolved leach residue.

2. The method of claim 1 wherein said initial scrap metal feed, in the molten state, comprises a minimum of about 25 weight percent of the metal of group (a) and at least 8 weight percent of the refractory metal of group (b).

3. The method of claim 1 wherein said scrap metal feed comprises nickel base alloy.

4. The method of claim 3 wherein said nickel base alloy is a superalloy.

5. The method of claim 1 wherein said scrap metal feed comprises cobalt base alloy.

6. The method of claim 5 wherein said cobalt base alloy is a superalloy.

7. The method of claim 1 wherein said melt carburizing is undertaken to the extent that the melt carburized scrap metal feed product has a carbon content of between about 0.5 and about 6.0 weight percent.

8. The method of claim 1 wherein carbon for the carburizing step is added to said scrap metal feed prior to melting thereof.

9. The method of claim 8 wherein carbon for the carburizing step is provided by mixing a metal scrap containing insufficient carbon for carburizing thereof with another metal scrap containing excess carbon for carburizing thereof, thereby to provide a composite initial scrap metal feed containing sufficient carbon for carburizing thereof.

10. The method of claim 1 wherein, prior to the carburizing step, oxidizable metal values are removed from the initial scrap metal feed by oxidation treatment thereof.

11. The method of claim 10 wherein said oxidation treatment comprises melting the scrap metal feed and introducing molecular oxygen thereinto.

12. The method of claim 10 wherein said oxidation treatment comprises melting the scrap metal feed and slagging the molten feed with an oxidizing slag.

13. The method of claim 1 wherein said aqueous acid leach liquor is hydrochloric acid.

14. The method of claim 1 wherein said aqueous acid leach liquor is sulfuric acid.

15. The method of claim 1 wherein the leach liquor product of the leaching step is treated to recover dissolved metal values therefrom.

* * * * *